US012465608B2

(12) United States Patent
Nash

(10) Patent No.: US 12,465,608 B2
(45) Date of Patent: Nov. 11, 2025

(54) OSIMERTINIB FOR USE IN THE TREATMENT OF NON-SMALL CELL LUNG CANCER

(71) Applicant: AstraZeneca AB, Sodertalje (SE)

(72) Inventor: Anthony Francis Patrick Nash, Cambridge (GB)

(73) Assignee: AstraZeneca AB, Södertälje (SE)

( * ) Notice: Subject to any disclaimer, the term of this patent is extended or adjusted under 35 U.S.C. 154(b) by 974 days.

(21) Appl. No.: 17/593,923

(22) PCT Filed: Mar. 27, 2020

(86) PCT No.: PCT/EP2020/058729
§ 371 (c)(1),
(2) Date: Sep. 28, 2021

(87) PCT Pub. No.: WO2020/201097
PCT Pub. Date: Oct. 8, 2020

(65) Prior Publication Data
US 2022/0175783 A1 Jun. 9, 2022

Related U.S. Application Data

(60) Provisional application No. 62/825,867, filed on Mar. 29, 2019.

(51) Int. Cl.
*A61K 31/519* (2006.01)
*A61K 31/506* (2006.01)
*A61K 31/517* (2006.01)
*A61K 33/243* (2019.01)
*A61P 35/04* (2006.01)
*A61K 9/20* (2006.01)

(52) U.S. Cl.
CPC .......... *A61K 31/519* (2013.01); *A61K 31/506* (2013.01); *A61K 31/517* (2013.01); *A61K 33/243* (2019.01); *A61P 35/04* (2018.01); *A61K 9/20* (2013.01)

(58) Field of Classification Search
None
See application file for complete search history.

(56) References Cited

U.S. PATENT DOCUMENTS

| | | | |
|---|---|---|---|
| 7,285,560 B2 | 10/2007 | Ritzeler et al. | |
| 7,807,673 B2 | 10/2010 | Uehling et al. | |
| 8,946,235 B2 | 2/2015 | Butterworth et al. | |
| 2009/0318480 A1* | 12/2009 | Solca ................ | A61K 31/517 514/266.24 |
| 2010/0016296 A1 | 1/2010 | Singh et al. | |
| 2010/0249092 A1 | 9/2010 | Singh et al. | |
| 2011/0046370 A1 | 2/2011 | Sim et al. | |
| 2011/0207736 A1 | 8/2011 | Gray et al. | |
| 2011/0263541 A1 | 10/2011 | Luo et al. | |
| 2012/0294867 A1 | 11/2012 | Denis et al. | |
| 2020/0368231 A1 | 11/2020 | Nash | |
| 2021/0369709 A1 | 12/2021 | Rukazenkov et al. | |

FOREIGN PATENT DOCUMENTS

| | | |
|---|---|---|
| EP | 3453392 A1 | 3/2019 |
| WO | 9719065 A1 | 5/1997 |
| WO | 9722596 A1 | 6/1997 |
| WO | 9730035 A1 | 8/1997 |
| WO | 9732856 A1 | 9/1997 |
| WO | 9813354 A1 | 4/1998 |
| WO | 9902166 A1 | 1/1999 |
| WO | 0040529 A1 | 7/2000 |
| WO | 0041669 A2 | 7/2000 |
| WO | 0047212 A1 | 8/2000 |
| WO | 0192224 A1 | 12/2001 |
| WO | 0194341 A1 | 12/2001 |
| WO | 0204434 A1 | 1/2002 |
| WO | 0208213 A1 | 1/2002 |
| WO | 02083653 A1 | 10/2002 |
| WO | 2005107758 A1 | 11/2005 |
| WO | 2006068826 A2 | 6/2006 |
| WO | 2006075152 A1 | 7/2006 |
| WO | 2006084058 A2 | 8/2006 |
| WO | 2007056221 A2 | 5/2007 |
| WO | 2007062805 A1 | 6/2007 |
| WO | 2007149427 A2 | 12/2007 |
| WO | 2008009458 A1 | 1/2008 |
| WO | 2010028236 A1 | 3/2010 |
| WO | 2010042337 A1 | 4/2010 |
| WO | 2010129053 A2 | 11/2010 |
| WO | 2011034907 A2 | 3/2011 |
| WO | 2011053476 A1 | 5/2011 |

(Continued)

OTHER PUBLICATIONS

Lamb, Y.N., Scott, L.J. Osimertinib: A Review in T790M-Positive Advanced Non-Small Cell Lung Cancer. Targ Oncol 12, 555-562 (2017). https://doi.org/10.1007/s11523-017-0519-0 (Year: 2017).*
FDA Tagrisso® Drug Label (https://www.accessdata.fda.gov/drugsatfda_docs/label/2024/208065s030lbl.pdf (Year: 2015).*
Watanbe, S. et al. Phase I Study Evaluating the Combination of Afatinib with Carboplatin and Pemetrexed After First-line EGFR-TKIs. Anticancer Research. Aug. 2018, 38 (8) 4699-4704 (Year: 2018).*
Ranson M., et al., "Preliminary results from a Phase I study with AZD9291: An irreversible inhibitor of epidermal growth factor receptor (EGFR) activating and resistance mutations in non-small cell lung cancer (NSCLC)," European Journal of Cancer, Sep. 2013, vol. 49 (Suppl 3), p. S15.

(Continued)

*Primary Examiner* — Clinton A Brooks
*Assistant Examiner* — Nicola Maria Bauer

(57) ABSTRACT

The specification relates to epidermal growth factor receptor (EGFR) tyrosine kinase inhibitors (TKIs) for use in the treatment of EGFR TKI-naïve patients with locally-advanced or metastatic EGFR mutation-positive non-small cell lung cancer (NSCLC), wherein the EGFR TKI is administered in combination with pemetrexed and platinum chemotherapy.

9 Claims, No Drawings

(56) References Cited

FOREIGN PATENT DOCUMENTS

| WO | 2011140338 A1 | 11/2011 |
|---|---|---|
| WO | 2011162515 A2 | 12/2011 |
| WO | 2012017239 A2 | 2/2012 |
| WO | 2012151561 A1 | 11/2012 |
| WO | 2013014448 A1 | 1/2013 |
| WO | 2014135876 A1 | 9/2014 |
| WO | 2015/048793 A2 | 4/2015 |
| WO | 2015101791 A1 | 7/2015 |
| WO | 2015/176033 A1 | 11/2015 |
| WO | 2016060443 A2 | 4/2016 |
| WO | 2016/170157 A1 | 10/2016 |
| WO | 2018102827 A1 | 6/2018 |
| WO | 2018/156812 A1 | 8/2018 |

OTHER PUBLICATIONS

Ranson M., et al., "Preliminary Results from a Phase I Study With AZD9291: An Irreversible Inhibitor of Epidermal Growth Factor Receptor (EGFR) Activating and Resistance Mutations in Non-small-cell Lung Cancer (NSCLC)", Presentation at ESMO 2013, Amsterdam, The Netherlands, Sep. 27-Oct. 1, 2013, 14 Pages.

Ready N., et al., "Chemoradiotherapy and Gefitinib in Stage III Non-Small Cell Lung Cancer with Epidermal Growth Factor receptor and KRAS Mutation Analysis: Cancer and Leukemia Group B (CALEB) 30106, A CALGB-Stratified Phase II Trial", Journal of Thoracic Oncology, Sep. 2010, vol. 5, No. 9, pp. 1382-1390.

Reungwetwattana T., et al., "CNS Response to Osimertinib Versus Standard Epidermal Growth Factor Receptor Tyrosine Kinase Inhibitors in Patients With Untreated EGFR-Mutated Advanced Non-Small-Cell Lung Cancer", Journal Of clinical oncology, Nov. 20, 2018, vol. 36, No. 33, pp. 3290-3297.

Roskoski R., "The ErbB/HER Receptor Protein-Tyrosine Kinases and Cancer," Biochemical and Biophysical Research Communication, Jun. 2004, vol. 319, pp. 1-11.

Sat Yat-Sen University: "Intermittent and Maintenance of Icotinib in Combination With Pemetrexed/Carboplatin Compared With Icotinib Single Drug in IIIb/IV Non-Small Cell Lung Cancer with Epidermal Growth Factor Receptor (EGFR) Mutation" ClinicalTrials.gov [online], NCT03151161, Jun. 5, 2018 (v4).

Shun L., et al., "Osimertinib Maintenance After Definitive Chemoradiation in Patients with Unresectable EGFRm-Positive Stage III NSCLC (LAURA)", Journal of Thoracic Oncology, IASLC 19th World Conference on Lung Cancer, Elsevier Inc. NLD, Oct. 2018, vol. 13, No. 10, 1 Page, XP002790158, ISSN 1556-0864.

Soria J-C., et al., "Osimertinib in Untreated EGFR-Mutated Advanced Non-Small-Cell Lung Cancer", The New England Journal of Medicine, Massachusetts Medical Society, US. Jan. 11, 2018, vol. 378, No. 2, pp. 113-125, XP002790155, ISSN 1533-4406, DOI: 10.1056/NEJMOA1713137, title, abstract, p. 123, middle.

Sugawara S., et al., "Randomized Phase II Study of Concurrent Versus Sequential Alternating Ge?tinib and Chemotherapy in Previously Untreated Non-small Cell Lung Cancer with Sensitive EGFR Mutations: NEJ005/TCOG0902", Annals of Oncology, May 2015, vol. 26, No. 5, pp. 888-894.

Sullivan I., et al., "Osimertinib in the Treatment of Patients with Epidermal Growth Factor Receptor T790M Mutation-Positive Metastatic Non-Small Cell Lung Cancer: Clinical Trial Evidence and Experience", Therapeutic Advances in Respiratory Disease, Sage Publications Ltd, UK, vol. 10, No. 6, Dec. 1, 2016, XP002786876, pp. 549-565, ISSN: 1753.4658, p. 553.

Tan C-S., et al., "Next-Generation Epidermal Growth Factor Receptor Tyrosine Kinase Inhibitors in Epidermal Growth Factor Receptor-Mutant Non-Small Cell Lung Cancer", Lung Cancer, vol. 93, 2016, pp. 59-68.

Wang X., et al., "Next-generation EGFR/HER Tyrosine Kinase Inhibitors for the Treatment of Patients with Non-small-cell Lung Cancer Harboring EGFR Mutations: A Review of the Evidence", Onco Targets and Therapy, Sep. 6, 2016, vol. 9, pp. 5461-5473, DOI: 10.2147/OTT.S94745.

Ward R.A., et al., "Structure-and Reactivity-Based Development of Covalent Inhibitors of the Activating and Gatekeeper Mutant Forms of the Epidermal Growth Receptor (EGFR)," Journal of Medicinal Chemistry, 2013, vol. 56 (17), pp. 7025-7048.

Ward R.A., et al., "Structure-Based Development of Covalent Inhibitors of the Activating and T790m Gatekeeper Mutant Forms of the Epidermal Growth Factor Receptor (EGFR) Leading to the Discovery of AZD9291," British Association for Cancer Research, Third Special Conference of "Advances in Cancer Drug Discovery" [Mar. 30-Apr. 1, 2014, Cambridge, UK, 31 pages.

Written Opinion of the International Application No. PCT/GB2012/051783 dated Oct. 17, 2012, 6 Pages.

Wu Y-L., et al., "Intercalated Combination of Chemotherapy and Erlotinib for Patients with Advanced Stage Non-small-cell Lung Cancer (FASTACT-2): A Randomised, Double-blind Trial", The Lancet Oncology, Jul. 2013, vol. 14, pp. 777-786.

Xing L., et al., "A Multicenter, Randomized, Openlabel, Phase II trial of Erlotinib Versus Etoposide Plus Cisplatin with Concurrent Radiotherapy in Unresectable Stage III Non-small Cell Lung Cancer (NSCIC) with Epidermal Growth Factor Receptor (EGFR) Activating Mutation", Journal of Clinical Oncology, 2017, vol. 35, No. 15, 3 Pages.

Yagishita S., et al., "Epidermal Growth Factor Receptor Mutation is Associated With Longer Local Control After Definitive Chemoradiotherapy in Patients With Stage III Nonsquamous Non-Small-Cell Lung Cancer", International Journal of Radiation: Oncology Biology Physics, Pergamon Press, USA, Oct. 13, 2014, vol. 91, No. 1, pp. 140-148, XP029116218, DOI: 10.1016/J.IJROBP.2014.08.344, ISSN 0360-3016.

Yoon S.M., et al., "Therapeutic Management Options for Stage III Non-Small Cell Lung Cancer", World Journal of Clinical Oncology, Feb. 10, 2017, vol. 8, No. 1, pp. 1-20, XP002790157, ISSN 2218-4333.

Yun C-H., et al., "The T790M Mutation in EGFR Kinase Causes Drug Resistance by Increasing the Affinity for ATP," Proceedings of the National Academy of Sciences of the United States of America, Feb. 12, 2008, vol. 105, No. 6, pp. 2070-2075, XP055068800.

Zhou W., et al., "Discovery of Selective Irreversible Inhibitors for EGFR-T790M," Bioorgorganic & Medicinal Chemistry Letters, 2011, vol. 21, No. 2, pp. 638-643, XP027593526.

Zhou W., et al., "Novel Mutant-Selective EGFR Kinase Inhibitors Against EGFR-T790M," Nature, Dec. 24, 2009, vol. 462, No. 24, 12 Pages, XP002729790.

Anderton M.J., et al., "AACR Influence of Early Toxicology Assessment on the Selection of AZD9291," Abstract No. 3676, Published Online on Mar. 5, 2014 in Advance of the Proceedings of the 105th Annual Meeting of the American Association for Cancer Research, San Diego CA, Philadelphia, Apr. 5-9, 2014, 1 Page.

Ashton S., et al., "Pre-Clinical In Vivo Xenograft Models to Develop Third Generation EGFR Mutant Tyrosine Kinase Inhibitors for NSCLC," Poster presented at 5th Freiburg Symposium on Anticancer Drug Discovery, Freiburg, Germany, Apr. 24-27, 2013, 1 page.

Ballard P., et al., "Integrating the Pre-Clinical Pharmacokinetic, Pharmacodynamic and Efficacy Data for AZD9291, an Oral, Irreversible Inhibitor of EGFR Activating (EGFRm+) and Resistant (EGFRm+/T790M) Mutations and an Active Metabolite to Predict the Human Pharmacokinetics and Potential Efficacious Dose in Patients," Poster presented at AACR-NCI-EORTC 2013, Boston, USA, Oct. 19-23, 2013, 1 page.

Bollinger M.K., et al., "Osimertinib: A Third-Generation Tyrosine Kinase Inhibitor for Treatment of Epidermal Growth Factor Receptor-Mutated Non-Small Cell Lung Cancer with the Acquired Thr790Met Mutation", Journal of Oncology Pharmacy Practice, vol. 24, No. 5, 2017, pp. 1-10, https://doi.org/10.1177/1078155217712401.

Bose R., et al., "The ErbB Kinase Domain: Structural Perspectives Into Kinase Activation and Inhibition," Experimental Cell Research, Feb. 15, 2009, vol. 315, No. 4, pp. 649-658, XP025929170.

(56) References Cited

OTHER PUBLICATIONS

Bundgaard H., "(C) Means to Enhance Penetration: (1) Prodrugs as a Means to Improve the Delivery of Peptide Drugs," May 6, 1991, Advanced Drug Delivery Reviews, Jan.-Feb. 1992, vol. 8, No. 1, pp. 1-38.

Bundgaard H., et al., "Design and Application of Prodrugs," Chapter 5, In Textbook of Drug Design and Development, 1991, 81 Pages.

"Cancer," [online], Medline PLUS, Trusted Health Information for you, A Service of the United Library of Medicine and the National Institutes of the Health, [Retrieved on Jul. 6, 2007], 10 Pages, Retrieved from the URL: http://www.nlm.nih.gov/medlineplus/print/cancer.html.

"Cancer," Wikipedia, the Free Encyclopedia [online], [Retrieved on Jul. 6, 2007], 2 Pages, Retrieved from the Internet: URL: http://en.wikipedia.org/wiki/Cancer.

Cheng H., et al., "A Meta-Analysis of Adjuvant EGFR-TKIs for Patients with Resected Non-Small Cell Lung Cancer", Lung Cancer, Elsevier, Amsterdam, NL, vol. 137, Aug. 5, 2019, pp. 7-13, XP085887894, ISSN: 0169-5002, DOI: 10.1016/J.LUNGCAN.2019.08.002, p. 10.

Cheng Y., et al., "Randomized Phase II Trial of Gefitinib With and Without Pemetrexed as First-Line Therapy in Patients With Advanced Nonsquamous Non-Small-Cell Lung Cancer With Activating Epidermal Growth Factor Receptor Mutations", Journal Of clinical Oncology, Sep. 20, 2016, vol. 34, No., 27, pp. 3258-3266.

Cho B.C., et al., "Lazertinib, a Third Generation EGFR-TKI, in Patients with EGFR-TKI-Resistant NSCLC: Updated Results of a Phase I/II Study", Journal of Thoracic Oncology, vol. 13, No. 10, Oct. 2018, p. S453.

Ciardiello F., et al., "EGFR Antagonists in Cancer Treatment," New England Journal of Medicine, Mar. 13, 2008, vol. 358, pp. 1160-1174.

Cross D., et al., "AZD9291: An Irreversible, Potent and Selective Third Generation Tyrosine Kinase Inhibitor (TKI) Targeting EGFR-TKI Sensitising (EGFRm+) and Resistance (T790M) Mutations in Advanced NSCLC," Poster Presented At AACR-NCI-EORTC, Boston, USA, Oct. 19-23, 2013, 1 Page.

Eberhardt W.E.E., et al., "2nd ESMO Consensus Conference in Lung Cancer: Locally Advanced Stage III Non-Small-Cell Lung Cancer", Annals of Oncology, Apr. 20, 2015, vol. 26, pp. 1573-1588.

Extended European Search Report for European Application No. 15192658.1, mailed Jan. 28, 2016, 04 Pages.

Extended European Search Report for European Application No. 17194307.9, mailed Mar. 8, 2018, 08 Pages.

Feng W., et al., "Feasibility and Safety of The Clinical Target vol. Desing for Postoperative Radiation Theraphy in Completely Resected Stage IIIA (N2) Non-Small Cell Lung Cancer: A Prospective Validation Study", International Journal of Radiation Oncology Biology Physics, 2016, vol. 96, No. 2, pp. E445-E446.

Finlay M.R.V., et al., "Discovery of A Potent and Selective EGFR Inhibitor (AZD9291) of Both Sensitizing and T790M Resistance Mutations That Spares The Wild Type Form of The Receptor," Journal of Medicinal Chemistry, Jun. 27, 2014, vol. 57, No. 20, 19 Pages.

Finlay M.R.V., et al., "Discovery of and First Disclosure of the Clinical Candidate AZD9291: a Potent and Selective, Third Generation EGFR inhibitor of both Activating and T790M Resistant Mutations that Spares the Wild Type Form of the Receptor," Poster presented at AACR-NCI-EORTC 2013, Boston, USA, Oct. 19-23, 2013, 1 page.

Flaherty C., "First-Line Osimertinib Plus Chemo Demonstrates Consistent Benefit in EGFR-Mutant NSCLC", European Lung Cancer Congress, 2024, 7 Pages.

Goldstraw P., et al., "The IASLC Lung Cancer Staging Project: Proposals for Revision of the TNM Stage Groupings in the Forthcoming (Eighth) Edition of the TNM Classification for Lung Cancer", Journal of Thoracic Oncology, 2016, vol. 11, No. 1, pp. 39-51.

Golub T.R., et al., "Molecular Classification of Cancer: Class Discovery and Class Prediction by Gene Expression Monitoring," Science, Oct. 15, 1999, vol. 286, No. 5439, 7 Pages.

Goss G., et al., "Osimertinib for Pretreated EGFR Thr790Met-Positive Advanced Non-Small-Cell Lung Cancer (AURA2): A Multicentre, Open-Label, Single-Arm, Phase 2 Study", The Lancet Oncology, Elsevier, Amsterdam, NL, Oct. 14, 2016, vol. 17, No. 12, pp. 1643-1652, XP029835817, DOI: 10.1016/S1470-2045(16)30508-3, ISSN 1470-2045.

Greene T.W., et al., "Protective Groups in Organic Synthesis," John Wiley & Sons Incorporated, Second Edition, Ch 7, 1991, pp. 315-345.

Han B., et al., "Combination of Chemotherapy and Gefitinib As First-line Treatment for Patients with Advanced Lung Adenocarcinoma and Sensitive EGFR Mutations: A Randomized Controlled Trial", International Journal of Cancer, 2017, vol. 141, pp. 1249-1256.

International Preliminary Report on Patentability for International Application No. PCT/GB2012/051783, mailed Feb. 6, 2014, 8 Pages.

International Search Report and Written Opinion for International Application No. PCT/EP2020/058729, mailed Jul. 1, 2020, 12 Pages.

International Search Report of International Application No. PCT/GB2012/051783, dated Oct. 17, 2012, 5 Pages.

Janne P.A., et al., "CNS Efficacy of Osimertinib With or Without Chemotherapy in Epidermal Growth Factor Receptor-Mutated Advanced Non-Small-Cell Lung Cancer", Journal of Clinical Oncology, 2024, vol. 42, No. 7, pp. 808-820.

Janne P.A., et al., "Randomized Phase II Trial of Erlotinib Alone or With Carboplatin and Paclitaxel in Patients Who Were Never or Light Former Smokers With Advanced Lung Adenocarcinoma: CALGB 30406 Trial", Journal of Clinical Oncology, Jun. 10, 2012, vol. 30, No. 17, pp. 2063-2069.

Kakeya N., et al., "Chemical and Pharmaceutical Bulletin," 1984, vol. 32, p. 692.

Kelly K., et al., "Phase III Trial of Maintenance Gefitinib or Placebo After Concurrent Chemoradiotherapy and Docetaxel Consolidation in Inoperable Stage III Non-Small-Cell Lung Cancer: SWOG S0023", Journal of Clinical Oncology, May 20, 2008, vol. 26, No. 15, pp. 2450-2456.

Komaki R., et al., "Adding Erlotinib to Chemoradiation Improves Overall Survival But Not Progression-Free Survival in Stage III Non-Small Cell Lung Cancer", International Journal of Radiation Oncology Biology Physics, 2015, vol. 92, No. 2, pp. 317-324.

Lala P.K., et al., "Role of Nitric Oxide in Tumor Progression: Lessons from Experimental Tumors," Journal of Cancer and Metastasis Reviews, 1998, vol. 17 (1), pp. 91-106.

Lee Y., et al., "Incorporating Erlotinib or Irinotecan Plus Cisplatin into Chemoradiotherapy for Stage III Non-small Cell Lung Cancer According to EGFR Mutation Status", Cancer Research and Treatment, 2017, vol. 49, No. 4, pp. 981-989.

Lipinski C.A., et al., "Experimental and Computational Approaches to Estimate Solubility and Permeability in Drug Discovery and Development Settings," Advanced Drug Delivery Review, 2001, vol. 46, No. 1-03, pp. 3-26, XP001097746.

Lombardo L. J., et al., "Discovery of N-(2-Chloro-6-methylphenyl)-2-(6-(4-(2-hydroxyethyl)-piperazin-1-yl)-2-methylpyrimidin-4-ylamino)thiazole-5-carboxamide (BMS-354825), a Dual Src/Abl Kinase Inhibitor with Potent Antitumor Activity in Preclinical Assays," Journal of Medicinal Chemistry, Jun. 2004, vol. 47, pp. 6658-6661.

Lynch T., et al., "Activating Mutations in the Epidermal Growth Factor Receptor Underlying Responsiveness of Non-Small-Cell Lung Cancer to Gefitinib", New England Journal of Medicine, May 20, 2004, vol. 350, No. 21, pp. 2129-2139.

Meador C., et al., "Acquired Resistance to Afatinib Plus Cetuximab in EGFR-Mutant Lung Adenocarcinoma may be Mediated by EGFR Overexpression and Overcome by the Mutant-specific EGFR Inhibitor, AZD9291," Poster presented at AACR-IASLC Joint Conference on Molecular Origins of Lung Cancer, San Diego, USA, Jan. 6-9, 2014, 1 Page.

Memorial Sloan Kettering Cancer Centre: "Afatinib in Combination with Cisplatin or Carboplatin + Pemetrexed in Patients with EGFR-

(56) References Cited

OTHER PUBLICATIONS

Mutant Lung Cancers Undergoing Definitive Chemoradiation", ClinicalTrials.gov [online], NCT01836341, Dec. 18, 2013 (v4), [retrieved online Oct. 12, 2022].

Mok T.S., et al., "Osimertinib or Platinum-Pemetrexed in EGFR T790M-Positive Lung Cancer", New England Journal of Medicine, Feb. 16, 2017, vol. 376, No. 7, pp. 629-640, XP002790156.

Narjes F., et al., "Discovery of (7R)-14-Cyclohexyl-7-{[2-(Dimethylamino)Ethyl](Methyl)Amino}-7,8-Dihydro-6H-Indolo[1,2-e][1,5]Benzoxazocine-11-Carboxylic Acid (MK-3281), a Potent and Orally Bioavailable Finger-Loop Inhibitor of the Hepatitis C Virus NS5B Polymerase," Journal of Medicinal Chemistry, Jan. 13, 2011, vol. 54, No. 1, pp. 289-301.

Nassar E., "Synthesis, (in vitro) Antitumor and Antimicrobial Activity of some Pyrazoline, Pyridine, and Pyrimidine Derivatives Linked to Indole Moiety," Journal of American Science, 2010, vol. 6, No. 8, pp. 338-347.

Nielsen N.M., et al., "Glycolamide Esters as Biolabile Prodrugs of Carboxylic Acid Agents: Synthesis, Stability, Bioconversion, and Physicochemical Properties," Journal of Pharmaceutical Sciences, Apr. 1988, vol. 77, No. 4, pp. 285-298.

Okamoto et al., "A Phase II, Open Label, Randomized Study of Osimertinib (TAgrisso) alone Versus Osimertinib plus Carboplatin/Pemetrexed for Patients With Locally Advanced or Metastatic Non-Small Cell Lung Cancer Whose Disease Has Progressed With Previous Epidermal Growth Factor Receptor Tyrosine Kinase Inhibitor Therapy and Whose Tumours Harbour a T790M Mutation Within the Epidermal Growth Factor Receptor Gene", Kyushu University, UMIN-CTR Clinical Trial, Phase II Clinical Trial, Oct. 17, 2016, pp. 1-11.

Paez G., et al., "EGFR Mutations in Lung Cancer: Correlation with Clinical Response to Gefitinib Therapy", Science, Jun. 4, 2004, vol. 304, pp. 1497-1500.

Planchard D., et al., "Osimertinib with or without Chemotherapy in EGFR-Mutated Advanced NSCLC", The New England Journal of Medicine, Nov. 23, 2023, vol. 389, No. 21, pp. 1935-1948.

Ranson M., et al., "AZD9291; an Irreversible Potent and Selective Tyrosine Kinase Inhibitor of Activating (EGFRm+) and Resistance (EGFRm+/T790M+) Mutations in Advanced NSCLC," Journal of Thoracic Oncology, Nov. 2013, vol. 8 (Suppl 2), p. S389, Abs MO21.12.

Ranson M., et al., "AZD9291; an Irreversible Potent and Selective Tyrosine Kinase Inhibitor of Activating (EGFRm+) and Resistance (EGFRm+/T790M+) Mutations in Advanced NSCLC," Presentation at WCLC 2013, Sydney, Australia, Oct. 27-30, 2013, 8 Pages.

\* cited by examiner

OSIMERTINIB FOR USE IN THE TREATMENT OF NON-SMALL CELL LUNG CANCER

CROSS-REFERENCE TO RELATED APPLICATIONS

This application is a U.S. National Stage application of International Application No. PCT/EP2020/058729, filed on Mar. 27, 2020, said International Application No. PCT/EP2020/058729 claims benefit under 35 U.S.C. § 119(e) of the U.S. Provisional Application No. 62/825,867, filed Mar. 29, 2019. Each of the above listed applications is incorporated by reference herein in its entirety for all purposes.

FIELD OF THE INVENTION

This specification describes epidermal growth factor receptor (EGFR) tyrosine kinase inhibitors (TKIs) for use in the treatment of EGFR TKI-naïve patients with locally-advanced or metastatic EGFR mutation-positive non-small cell lung cancer (NSCLC). In particular, the specification describes the combination of either a second-generation or a third-generation EGFR TKI with pemetrexed and platinum chemotherapy.

BACKGROUND OF THE INVENTION

Primary lung cancer is the most common form of cancer worldwide (approximately 13.5% of all new cancers cases in 2018) and it remains the leading cause of cancer-related death globally (25.3% of all deaths from cancer). Non-small cell lung cancer (NSCLC) represents approximately 80% to 90% of all lung cancers [National Comprehensive Cancer Network (NCCN) guidelines 2019 for NSCLC].

Despite recent progress in early detection, in 70% to 80% of patients, lung cancer is diagnosed at a locally-advanced or metastatic stage when it is no longer amenable to surgical resection [NCI Surveillance, Epidemiology, and End Results Program. Cancer Stat Facts: lung and bronchus cancer. Available at: https://seer.cancer.gov/statfacts/html/lungb.html. Accessed Nov. 8, 2018]. Advanced NSCLC is an incurable condition. Despite the development of new therapies, the prognosis remains dismal, with a mean 5-year survival rate of approximately 5% in patients with NSCLC where EGFR status is unknown.

In current clinical practice, therapeutic decisions for patients with advanced NSCLC are informed by the molecular subtypes of tumours [NCCN guidelines 2019 for NSCLC]. Molecular profiling of patients with advanced NSCLC for biomarkers is standard clinical practice based on international guidelines and is conducted to detect the presence of predictive and prognostic biomarkers for NSCLC [NCCN guidelines 2019 for NSCLC].

Numerous gene mutations or alterations have been identified as molecular therapeutic targets that impact the choice of therapy. Among these mutations, the presence of EGFR activating mutations, the most common of which are Ex19del and L858R, is associated with responsiveness to EGFR TKI therapy (for example, erlotinib, gefitinib, afatinib, osimertinib and dacomitinib). Other gene alterations detected in NSCLC include anaplastic lymphoma kinase (ALK) fusion gene rearrangements, associated with responsiveness to ALK-TKIs; ROS proto-oncogene 1 (ROS1) gene rearrangements, associated with responsiveness to ROS1-TKIs; B-Raf proto-oncogene (BRAF) point mutations, some of which (V600E) respond to combined therapy with oral inhibitors of BRAF and MEK; and KRAS proto-oncogene (KRAS) point mutations, which are indicative of poor survival and reduced response to EGFR-TKIs. Other evolving biomarkers include human epidermal growth factor receptor 2 (HER2), MET exon 14 mutations, and fusion genes involving RET and neurotropic tropomyosin receptor kinase 1 (NTRK1) (*Annals Oncol.* [2018], vol. 29(suppl_4): iv192-iv237).

The established first-line therapy in patients with advanced NSCLC and a tumour harbouring activating EGFR mutations discovered prior to first-line systemic therapy is one of the following EGFR-TKIs: osimertinib (labelled as preferred by the NCCN panel), erlotinib, afatinib, gefitinib, or dacomitinib (NCCN guidelines 2019 for NSCLC). Patients with advanced mutation-positive EGFR NSCLC who receive EGFR-TKIs have a median overall survival (OS) of more than 2 years, in contrast with the survival of unselected patients receiving platinum-based chemotherapy (approximately 12 months; J Clin Oncol. [2012], vol. 30(27), 3417-20). In patients with activating EGFR mutations, response rates (RR) of 50% to 80% have been reported with first-line EGFR-TKI treatment, compared with 15% to 34% in patients receiving platinum-doublet chemotherapy as first-line therapy or as second line therapy following progression on first-line treatment with EGFR-TKIs (*N. Engl. J. Med.* [2010], vol. 362(25), 2380-8; *N. Engl. J. Med.* [2017], vol. 376(7), 629-40; *Lancet Oncol.* [2012], vol. 13(3), 239-46; *J. Clin. Oncol.* [2013], vol. 31(27), 3327-34; Lancet Oncol. [2015], vol. 16(8), 990-8; Lancet Oncol. [2014], vol. 15, 213-22). In a phase III study dacomitinib, a second generation EGFR TKI, prolonged Progression-Free Survival (PFS) in comparison with gefitinib when given as first line treatment in patients with EGFR mutation-positive NSCLC-median PFS 14.7 months (95% Confidence Interval (CI) 11.1-16.6) vs 9.2 months (9.1-11.0) (Hazard Ratio (HR) 0.59, 95% CI 0.47-0.74; p<0.0001) [*Lancet Oncol.* [2017], vol18(11), 1454-1466].

The Phase III FLAURA study (*N. Engl. J Med.* [2018], vol. 378, 113-25) comparing the efficacy and safety of osimertinib administered as first-line therapy to patients with advanced mutation-positive EGFR (Ex19del or L858R) NSCLC versus (vs.) either gefitinib or erlotinib showed a significantly improved median progression free survival (PFS) in the osimertinib arm (18.9 months [95% confidence interval [CI]: 15.2, 21.4]) compared to erlotinib or gefitinib (10.2 months [95% CI: 9.6, 11.1]), with a hazard ratio (HR) of 0.46 (95% CI: 0.37, 0.57; p<0.0001). On the basis on the results of the FLAURA study, osimertinib is recommended by the NCCN Panel as preferred first-line therapy in these patients. Of note, in the FLAURA study, irrespective of status with respect to known or treated Central Nervous System (CNS) metastases at trial entry, events of CNS progression were observed in 6% patients in the osimertinib group and 15% in the standard EGFR TKI group. Moreover, in patients with CNS metastases on a baseline brain scan, osimertinib demonstrated a nominally statistically significant and clinically meaningful improvement in CNS PFS over standard EGFR-TKIs with a 52% reduction in the risk of CNS progression (HR 0.48; 95% Cl 0.26-0.86 p=0.014; median CNS PFS not reached (95% CI 16.5, NC (i.e. could Not be Calculated)) vs 13.9 months (95% CI 8.3 to NC); J Clin Oncol. [2018], vol. 36(33), 3290-7).

Chemotherapy and First-Generation EGFR TKIs

NCCN 2019 guidelines for NSCLC do not recommend adding EGFR-TKIs to current chemotherapy for patients with EGFR mutation positive NSCLC. The guideline is based on data from a subgroup of randomized Phase II study CALGB 30406 which compared erlotinib alone vs. erlotinib combined with chemotherapy with carboplatin plus paclitaxel as first-line treatment for patients with advanced EGFR mutation-positive NSCLC who were never- or light-former smokers (*J Clin Oncol.* [2012], vol. 30(17), 2063-9). In the subgroup of patients with EGFR mutations PFS and OS was similar in both arms of the study and the combination was associated with more side effects than erlotinib monotherapy. The chemotherapy regimen in this study did not include pemetrexed.

However, in a recent Phase III study (NEJ009) the addition of carboplatin and pemetrexed to gefitinib as first-line treatment of patients with untreated advanced EGFR mutation-positive NSCLC improved the progression-free survival (PFS) and overall survival (OS) of patients, with an acceptable toxicity profile, relative to gefitinib monotherapy (*J. Clin. Oncol.* [2018], vol. 36 (15_suppl):abstr 9005; *Annals Oncol.* [2018], vol. 29(suppl_8):viii493-viii547. 10.1093/annonc/mdy292.). These data support the concept of adding chemotherapy to first-generation EGFR-TKI therapy in the first-line treatment of patients with advanced EGFR mutation-positive NSCLC. Other smaller clinical trials have investigated the use of first-generation EGFR TKIs such as gefitinib and erlotinib in combination with chemotherapy as a first-line treatment for EGFR mutation-positive NSCLC and together provide supportive data for first generation EGFR TKI therapy in combination with chemotherapy (*J. Clin. Oncol.* [2018], vol. 36 (15_suppl): abstr 9005; Doi:10.1136/esmoopen-2017-000313; *Annals Oncol.* [2015], vol. 26(5), 888-94; *Int. J. Cancer.* [2017], vol. 141(6), 1249-56; *J. Clin. Oncol.* [2016], vol. 34(27), 3258-66; *Annals Oncol.* [2018], vol. 29 (suppl_8):1381PD; *Lung Cancer,* [2015], vol. 90(1), 65-70; *Lancet Oncol.* [2013], vol. 14(8), 777-86; *J. Clin. Oncol.* [2014], vol. 32 (no. 15_suppl):e19076; "Is upfront combo therapy better than the sum of its parts?", *Medscape*, Aug. 9, 2018).

Chemotherapy in Combination with Second or Third-Generation EGFR TKIs

Whether there is a role for chemotherapy given in combination with second or third-generation EGFR TKIs (e.g. osimertinib) in this setting remains unclear.

As noted above, the NEJ009 Phase III study showed that the combination of pemetrexed and platinum chemotherapy with gefitinib as a first-line treatment of patients with untreated advanced EGFR mutation-positive NSCLC improved the PFS and OS of patients relative to gefitinib monotherapy.

However, the clinical benefit of first generation TKI monotherapy can be significantly lower than that of second-generation or third-generation EGFR TKI monotherapy. As also noted above, this was demonstrated in the FLAURA Phase III clinical trial, median PFS in the osimertinib arm was 18.9 months, compared to 10.2 months for the erlotinib/gefitinib arm. Before the present disclosure, there was no information on whether the additional benefit of the pemetrexed and platinum chemotherapy combination versus monotherapy observed for gefitinib in the NEJ009 Phase III study would be observed for second or third generation EGFR TKIs.

A Phase II, open label, randomized study of osimertinib alone versus osimertinib plus carboplatin/pemetrexed for patients with locally advanced or metastatic NSCLC whose disease has progressed with previous EGFR TKI therapy and whose tumours harbour a T790M mutation within the epidermal growth factor receptor gene is currently on-going (UMIN000024438), but the results are not yet known and would not be directly applicable to the first line setting (i.e. EGFR TKI-naïve patients). Moreover, there have been no reported trials investigating the outcome of either a second-generation or third-generation EGFR TKI in combination with pemetrexed and platinum chemotherapy in EGFR TKI-naïve patients with EGFR mutation-positive NSCLC.

Locally-advanced cancer that is not amenable to curative surgery or radiotherapy and metastatic EGFR mutation-positive NSCLC are incurable conditions. As such, there remains a high unmet medical need for patients with these conditions.

We have found that the use of osimertinib in combination with pemetrexed and platinum chemotherapy may result in an improved prognosis, for example an improvement in one or more of improved progression free survival (PFS), or improved duration of response (DoR), or improved overall survival (OS).

SUMMARY OF THE INVENTION

The present specification describes an EGFR TKI for use in the treatment of an EGFR TKI-naïve patient with locally-advanced or metastatic EGFR mutation-positive NSCLC, wherein the EGFR TKI is administered in combination with pemetrexed and platinum chemotherapy, and wherein the EGFR TKI is either a second-generation or third-generation EGFR TKI.

The specification further describes such treatment wherein the treatment results in one or more of improved progression free survival (PFS); improved duration of response (DoR); or improved overall survival (OS).

DETAILED DESCRIPTION OF THE INVENTION

In a first aspect, there is provided an EGFR TKI for use in the treatment of an EGFR TKI-naïve patient with locally-advanced or metastatic EGFR mutation-positive NSCLC, wherein the EGFR TKI is administered in combination with pemetrexed and platinum chemotherapy, and wherein the EGFR TKI is either a second-generation or third-generation EGFR TKI.

In a further aspect, there is provided a method of treating locally-advanced or metastatic EGFR mutation-positive NSCLC in an EGFR TKI-naïve human patient comprising administering to the patient an EGFR TKI, wherein the EGFR TKI is administered in combination with pemetrexed and platinum chemotherapy, and wherein the EGFR TKI is either a second-generation or third-generation EGFR TKI.

In a further aspect, there is provided the use of an EGFR TKI in the manufacture of a medicament for the treatment of an EGFR TKI-naïve patient with locally-advanced or metastatic EGFR mutation-positive NSCLC, wherein the EGFR TKI is administered in combination with pemetrexed and platinum chemotherapy, and wherein the EGFR TKI is either a second-generation or third-generation EGFR TKI.

As used herein, the term "about" when referring to any given numerical value means within ±10% of that value.

EGFR Mutation Positive NSCLC and Diagnostic Methods

In 2004 it was reported that activating mutations in exons 18-21 of EGFR correlated with a response to EGFR-TKI therapy in NSCLC (*Science* [2004], vol. 304, 1497-1500; *New England Journal of Medicine* [2004], vol. 350, 2129-2139). It is estimated that these mutations are prevalent in approximately 10-16% of NSCLC patients in the United States and Europe, and in approximately 30-50% of NSCLC patients in Asia. Two of the most significant EGFR activating mutations are the exon 19 deletions and the missense mutations in exon 21. The exon 19 deletions account for approximately 45% of known EGFR mutations. Eleven different mutations, resulting in deletion of three to seven amino acids, have been detected in exon 19, and all are centred around the uniformly deleted codons for amino acids 747-749. The most significant exon 19 deletion is E746-A750. The missense mutations in exon 21 account for approximately 39-45% of known EGFR mutations, of which the substitution mutation L858R accounts for approximately 39% of the total mutations in exon 21 (J. Thorac. Oncol. [2010], 1551-1558). The skilled person will be aware of the mutations in EGFR which correlate with an improved response to EGFR-TKI therapy.

In embodiments, therefore, the EGFR mutation-positive NSCLC comprises activating mutations in EGFR. In further embodiments, the activating mutations in EGFR comprise activating mutations in exons 18-21. In further embodiments, the activating mutations in EGFR comprise exon 19 deletions or missense mutations in exon 21. In further embodiments, the activating mutations in EGFR comprise exon 19 deletions or L858R substitution mutations.

In embodiments, the locally-advanced or metastatic EGFR mutation-positive NSCLC is a locally-advanced EGFR mutation-positive NSCLC.

In embodiments, the locally-advanced or metastatic EGFR mutation-positive NSCLC is a metastatic EGFR mutation-positive NSCLC.

In embodiments, the locally-advanced or metastatic EGFR mutation-positive NSCLC is not amenable to curative surgery or radiotherapy.

There are numerous methods to detect EGFR activating mutations, of which the skilled person will be aware. A number of tests suitable for use in these methods have been approved by the US Food and Drug Administration (FDA). These include both tumour tissue and plasma based diagnostic methods. In general, the EGFR mutation status is first assessed using a tumour tissue biopsy sample derived from the patient. If a tumour sample is unavailable, or if the tumour sample is negative, the EGFR mutation status may be assessed using a plasma sample. A particular example of a suitable diagnostic test to detect EGFR activating mutations, and in particular to detect exon 19 deletions or L858R substitution mutations, is the Cobas™ EGFR Mutation Test v2 (Roche Molecular Diagnostics).

In embodiments, therefore, the EGFR mutation-positive NSCLC comprises activating mutations in EGFR (such as activating mutations in exons 18-21, for example exon 19 deletions or missense mutations in exon 21, for example exon 19 deletions or L858R substitution mutations), wherein the EGFR mutation status of the patient has been determined using an appropriate diagnostic test. In further embodiments, the EGFR mutation status has been determined using a tumour tissue sample. In further embodiments, the EGFR mutation status has been determined using a plasma sample. In further embodiments, the diagnostic method uses an FDA-approved test. In further embodiments, the diagnostic method uses the Cobas™ EGFR Mutation Test (v1 or v2).

EGFR TKIs and the T790M Mutation

EGFR TKIs can be characterised as either first-, second- or third-generation EGFR TKIs, as set out below.

First-generation EGFR TKIs are reversible inhibitors of EGFR bearing activating mutations that do not significantly inhibit EGFR bearing the T790M mutation. Examples of first-generation TKIs include gefitinib and erlotinib.

Second-generation EGFR TKIs are irreversible inhibitors of EGFR bearing activating mutations that do not signifi-cantly inhibit EGFR bearing the T790M mutation. Examples of second-generation TKIs include afatinib and dacomitinib.

Third-generation EGFR TKIs are inhibitors of EGFR bearing activating mutations that also significantly inhibit EGFR bearing the T790M mutation and do not significantly inhibit wild-type EGFR. Examples of third-generation TKIs include osimertinib, AZD3759, lazertinib, nazartinib, CO1686 (rociletinib), HM61713, ASP8273, EGF816 and PF-06747775 (mavelertinib).

In embodiments, the EGFR TKI is a second-generation EGFR TKI. In further embodiments, the second-generation EGFR TKI is dacomitinib, or a pharmaceutically acceptable salt thereof.

In embodiments, the EGFR TKI is a third-generation EGFR TKI. In further embodiments, the third-generation EGFR TKI is selected from the group consisting of osimertinib, or a pharmaceutically acceptable salt thereof, AZD3759, or a pharmaceutically acceptable salt thereof, and lazertinib, or a pharmaceutically acceptable salt thereof. In further embodiments, the third generation EGFR TKI is osimertinib, or a pharmaceutically acceptable salt thereof.

Osimertinib and Pharmaceutical Compositions Thereof

Osimertinib has the following chemical structure:

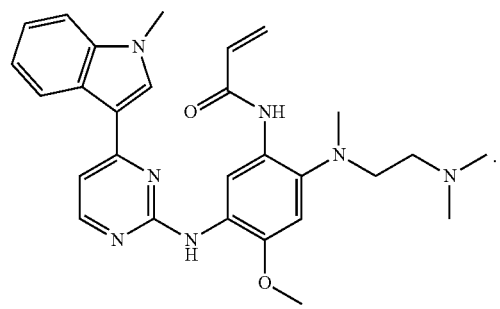 [SMILES: C=CC(=O)Nc1cc(Nc2nccc(-c3cn(C)c4ccccc34)n2)c(OC)cc1N(C)CCN(C)C]

The free base of osimertinib is known by the chemical name: N-(2-{2-dimethylamino ethyl-methylamino}-4-methoxy-5-{[4-(1-methylindol-3-yl)pyrimidin-2-yl] amino}phenyl) prop-2-enamide. Osimertinib is described in WO 2013/014448. Osimertinib is also known as AZD9291.

Osimertinib may be found in the form of the mesylate salt: N-(2-{2-dimethylamino ethyl-methylamino}-4-methoxy-5-{[4-(1-methylindol-3-yl)pyrimidin-2-yl]amino}phenyl) prop-2-enamide mesylate salt. Osimertinib mesylate is also known as TAGRISSO™.

Osimertinib mesylate is currently approved as an oral once daily tablet formulation, at a dose of 80 mg (expressed as free base, equivalent to 95.4 mg osimertinib mesylate), for the treatment of metastatic EGFR T790M mutation positive NSCLC patients. A 40 mg oral once daily tablet formulation (expressed as free base, equivalent to 47.7 mg osimertinib mesylate) is available should dose modification be required. The tablet core comprises pharmaceutical diluents (such as mannitol and microcrystalline cellulose), disintegrants (such as low-substituted hydroxypropyl cellulose) and lubricants (such as sodium stearyl fumarate). The tablet formulation is described in WO 2015/101791.

In embodiments, therefore, osimertinib, or a pharmaceutically acceptable salt thereof, is in the form of the mesylate salt, i.e. N-(2-{2-dimethylamino ethyl-methylamino}-4-methoxy-5-{[4-(1-methylindol-3-yl)pyrimidin-2-yl] amino}phenyl) prop-2-enamide mesylate salt.

In embodiments, osimertinib, or a pharmaceutically acceptable salt thereof, is administered once-daily. In further embodiments, osimertinib mesylate is administered once-daily.

In embodiments, the total daily dose of osimertinib is about 80 mg. In further embodiments, the total daily dose of osimertinib mesylate is about 95.4 mg.

In embodiments, the total daily dose of osimertinib is about 40 mg. In further embodiments, the total daily dose of osimertinib mesylate is about 47.7 mg.

In embodiments, osimertinib, or a pharmaceutically acceptable salt thereof, is in tablet form.

In embodiments, osimertinib, or a pharmaceutically acceptable salt thereof, is administered in the form of a pharmaceutical composition comprising one or more pharmaceutically acceptable excipients. In further embodiments, the composition comprises one or more pharmaceutical diluents (such as mannitol and microcrystalline cellulose), one or more pharmaceutical disintegrants (such as low-substituted hydroxypropyl cellulose) or one or more pharmaceutical lubricants (such as sodium stearyl fumarate).

In embodiments, the composition is in the form of a tablet, wherein the tablet core comprises: (a) from 2 to 70 parts of osimertinib, or a pharmaceutically acceptable salt thereof; (b) from 5 to 96 parts of two or more pharmaceutical diluents; (c) from 2 to 15 parts of one or more pharmaceutical disintegrants; and (d) from 0.5 to 3 parts of one or more pharmaceutical lubricants; and wherein all parts are by weight and the sum of the parts (a)+(b)+(c)+(d)=100.

In embodiments, the composition is in the form of a tablet, wherein the tablet core comprises: (a) from 7 to 25 parts of osimertinib, or a pharmaceutically acceptable salt thereof; (b) from 55 to 85 parts of two or more pharmaceutical diluents, wherein the pharmaceutical diluents comprise microcrystalline cellulose and mannitol; (c) from 2 to 8 parts of pharmaceutical disintegrant, wherein the pharmaceutical disintegrant comprises low-substituted hydroxypropyl cellulose; (d) from 1.5 to 2.5 parts of pharmaceutical lubricant, wherein the pharmaceutical lubricant comprises sodium stearyl fumarate; and wherein all parts are by weight and the sum of the parts (a)+(b)+(c)+(d)=100.

In embodiments, the composition is in the form of a tablet, wherein the tablet core comprises: (a) about 19 parts of osimertinib mesylate; (b) about 59 parts of mannitol; (c) about 15 parts of microcrystalline cellulose; (d) about 5 parts of low-substituted hydroxypropyl cellulose; and (e) about 2 parts of sodium stearyl fumarate; and wherein all parts are by weight and the sum of the parts (a)+(b)+(c)+(d)+(e)=100.

AZD3759

AZD3759 has the following chemical structure:

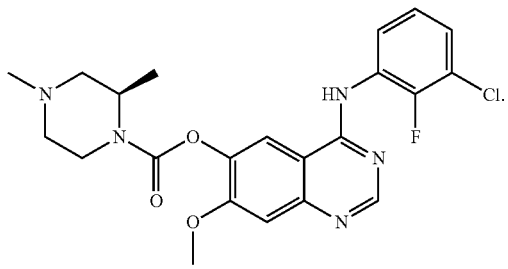 [SMILES: COc1cc2ncnc(Nc3cccc(Cl)c3F)c2cc1OC(=O)N1CCN(C)C[C@H]1C]

The free base of AZD3759 is known by the chemical name: 4-[(3-chloro-2-fluorophenyl)amino]-7-methoxy-6-quinazolinyl (2R)-2,4-dimethyl-1-piperazinecarboxylate. AZD3759 is described in WO 2014/135876.

In embodiments, AZD3759, or a pharmaceutically acceptable salt thereof, is administered twice-daily. In further embodiments, AZD3759 is administered twice-daily.

In embodiments, the total daily dose of AZD3759 is about 400 mg. In further embodiments, about 200 mg of AZD3759 is administered twice a day.

Lazertinib

Lazertinib has the following chemical structure:

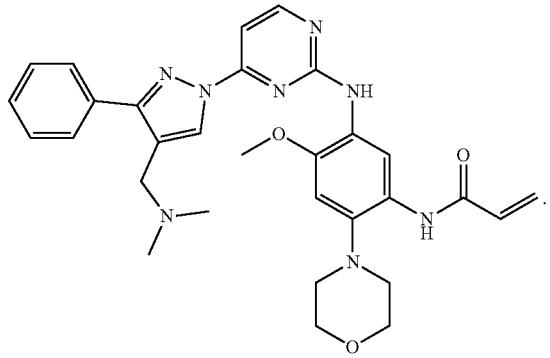 [SMILES: C=CC(=O)Nc1cc(Nc2nccc(-n3cc(CN(C)C)c(-c4ccccc4)n3)n2)c(OC)cc1N1CCOCC1]

The free base of lazertinib is known by the chemical name N-{5-[(4-{4-[(dimethylamino)methyl]-3-phenyl-1H-pyrazol-1-yl}-2-pyrimidinyl)amino]-4-methoxy-2-(4-morpholinyl)phenyl}acrylamide. Lazertinib is described in WO 2016/060443. Lazertinib is also known by the names YH25448 and GNS-1480.

In embodiments, lazertinib, or a pharmaceutically acceptable salt thereof, is administered once-daily. In further embodiments, lazertinib is administered once-daily.

In embodiments, the total daily dose of lazertinib is about 240 mg.

Dacomitinib Dacomitinib has the following chemical structure:

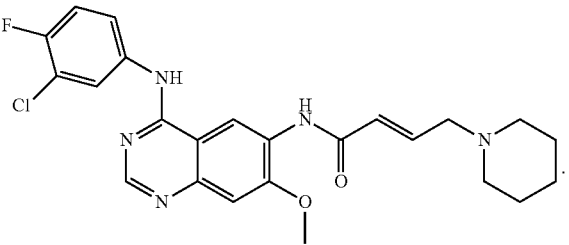 [SMILES: COc1cc2ncnc(Nc3ccc(F)c(Cl)c3)c2cc1NC(=O)/C=C/CN1CCCCC1]

The free form of dacomitinib is known by the chemical name: (2E)-N-{4-[(3-chloro-4-fluorophenyl)amino]-7-methoxyquinazolin-6-yl}-4-(piperidin-1-yl)but-2-enamide. Dacomitinib is described in WO 2005/107758. Dacomitinib is also known by the name PF-00299804.

Dacomitinib may be found in the form of dacomitinib monohydrate, i.e. (2E)-N-{4-[(3-chloro-4-fluorophenyl)amino]-7-methoxyquinazolin-6-yl}-4-(piperidin-1-yl)but-2-enamide monohydrate.

In embodiments, dacomitinib, or a pharmaceutically acceptable salt thereof, is administered once-daily. In further embodiments, dacomitinib monohydrate is administered once-daily.

In embodiments, the total daily dose of dacomitinib monohydrate is about 45 mg.

In embodiments, dacomitinib, or a pharmaceutically acceptable salt thereof, is in tablet form.

In embodiments, dacomitinib, or a pharmaceutically acceptable salt thereof, is administered in the form of a pharmaceutical composition comprising one or more pharmaceutically acceptable excipients. In further embodiments, the one or more pharmaceutically acceptable excipients comprise lactose monohydrate, microcrystalline cellulose, sodium starch glycolate and magnesium stearate.

Platinum-Based Chemotherapy

In embodiments, the platinum chemotherapy comprises administration of cisplatin.

In embodiments, the platinum chemotherapy consists of administration of cisplatin.

The total daily dose of cisplatin is generally calculated by reference to Body Surface Area (BSA), and the daily dose typically ranges from between about 50 mg/m$^2$ to about 120 mg/m$^2$. In embodiments, therefore, the maximum daily dose of cisplatin is up to about 150 mg/m$^2$, such as up to about 120 mg/m$^2$, such as up to about 100 mg/m$^2$, such as up to about 90 mg/m$^2$, such as up to about 80 mg/m$^2$, such as up to about 70 mg/m$^2$, such as up to about 60 mg/m$^2$, such as up to about 50 mg/m$^2$. In embodiments, the total daily dose of cisplatin is about 75 mg/m$^2$.

Patients undergoing chemotherapy with cisplatin do not generally receive cisplatin daily and cisplatin is generally administered in treatment cycles. In embodiments, the treatment cycle is up to 42 days, such as up to 35 days, such as up to 28 days, such as up to 21 days. In embodiments, cisplatin is administered on day 1 of each treatment cycle. In embodiments, cisplatin is administered on day 1 only of a treatment cycle lasting 21 days.

Alternatively, patients may receive cisplatin over a 5-day period. These patients typically receive a maximum daily dose of between about 15 mg/m$^2$ and about 20 mg/m$^2$ for 5 consecutive days. In embodiments, the treatment cycle is up to 42 days, such as up to 35 days, such as up to 28 days, such as up to 21 days. In embodiments, cisplatin is administered only on days 1 to 5 of each treatment cycle. In embodiments, cisplatin is administered only on days 1 to 5 of a treatment cycle lasting 21 days.

In embodiments, the platinum chemotherapy comprises administration of carboplatin.

In embodiments, the platinum chemotherapy consists of administration of carboplatin.

The total daily dose of carboplatin is generally calculated by reference to the Area Under the Curve (AUC) for a given patient using a formula known to those skilled in the art (such as the Calvert Formula). The typical daily dose ranges from AUC 2 to AUC 7. In embodiments, the maximum daily dose of carboplatin is up to AUC 7, such as up to AUC 6, such as up to AUC 5, such as up to AUC 4, such as up to AUC 3, such as up to AUC 2. In embodiments, the total dose of carboplatin is about AUC 5.

Patients undergoing chemotherapy with carboplatin do not generally receive carboplatin daily and carboplatin is generally administered in treatment cycles. In embodiments, the treatment cycle is up to 21 days, such as up to 14 days, such as up to 7 days. In embodiments, carboplatin is administered on day 1 of each treatment cycle. In embodiments, carboplatin is administered on day 1 only of a treatment cycle lasting 21 days.

Pemetrexed

In embodiments, the total daily dose of pemetrexed is up to about 500 mg/m$^2$, such as about 500 mg/m$^2$. In further embodiments, pemetrexed is administered on day 1 of a treatment cycle lasting 21 days.

In embodiments, the pemetrexed is administered with vitamin supplementation, such as supplementation with vitamin B12 and folic acid.

In embodiments, there is a 21-day cycle, wherein pemetrexed (total daily dose of about 500 mg/m$^2$, optionally with vitamin supplementation) plus either cisplatin (total daily dose of about 75 mg/m$^2$) or carboplatin (total daily dose of about AUC 5 or about AUC 6) are administered on day one only of a 21-day cycle. In further embodiments, there are 4 sequential 21-day cycles. In still further embodiments, the 4 sequential 21-day cycles are followed by pemetrexed maintenance therapy, wherein the pemetrexed maintenance therapy comprises administration of pemetrexed (total daily dose of about 500 mg/m$^2$, optionally with vitamin supplementation) once every 21 days until disease progression or unacceptable toxicity.

Clinical Outcome

Patients with locally-advanced or metastatic EGFR mutation-positive NSCLC who receive an EGFR TKI according to this specification may benefit from an improved prognosis compared to existing standard of care. In particular, such patients may benefit one or more of improved progression free survival (PFS); increased objective response rate; improved duration of response (DoR); or improved overall survival (OS).

In embodiments, therefore, the patient benefits from progression free survival of at least 16 months, such as at least 18 months, such as at least 20 months, such as at least 22 months, such as at least 24 months, such as at least 26 months, such as at least 28 months, such as at least 30 months, such as at least 32 months, such as at least 34 months, such as at least 36 months. In further embodiments, the patient benefits from a duration of response of at least 14 months, such as at least 16 months, such as at least 18 months, such as at least 20 months, such as at least 25 months, such as at least 30 months, such as at least 35 months. In further embodiments, the patient benefits from an overall survival of at least 30 months, such as at least 35 months, such as at least 40 months, such as at least 45 months, such as at least 50 months, such as at least 55 months, such as at least 60 months, such as at least 65 months, such as at least 70 months.

Patients with advanced or metastatic EGFR mutation-positive NSCLC with CNS metastases on a baseline brain scan who receive an EGFR TKI according to this specification may particularly benefit from an improved prognosis compared to existing standard of care.

In embodiments, therefore, the patient with CNS metastases on a baseline brain scan benefits from progression free survival of at least 12 months, such as at least 14 months, such as at least 16 months, such as at least 18 months, such as at least 20 months, such as at least 22 months, such as at least 24 months, such as at least 26 months, such as at least 28 months, such as at least 30 months, such as at least 32 months, such as at least 34 months, such as at least 36 months.

Within this disclosure, Central Nervous System Progression Free Survival (CNS PFS) means the time from the start of study treatment until progression of an existing CNS lesion and/or a new CNS lesion or death in the absence of CNS progression.

Patients with advanced or metastatic EGFR mutation-positive NSCLC with CNS metastases on a baseline brain scan who receive an EGFR TKI according to this specification may particularly benefit from an improved prognosis compared to existing standard of care based upon an improvement in CNS progression-free survival via (i) preventing/delaying occurrence of new central nervous system metastases, in particular brain metastases and/or, (ii) preventing/delaying progression of pre-existing CNS metastases, in particular brain metastases and/or (iii) preventing/delaying death in the absence of CNS progression.

In embodiments, therefore, the patient with CNS metastases on a baseline brain scan benefits from CNS progression free survival such as at least 14 months, such as at least 16 months, such as at least 18 months, such as at least 20 months, such as at least 22 months, such as at least 24 months, such as at least 26 months, such as at least 28 months, such as at least 30 months, such as at least 32 months, such as at least 34 months, such as at least 36 months.

In embodiments, therefore, the EGFR TKI provided according to this specification is for use in improving in a patient with CNS metastases on a baseline brain scan one or both of duration of response (DoR) and overall survival (OS).

Examples

A Phase III, randomized, double-blind, placebo-controlled, multicentre, international study of osimertinib in combination with chemotherapy as first-line treatment for patients with locally-advanced or metastatic EGFR mutation-positive NSCLC.

The title of the study is, "A Phase III, Open-label, Randomized Study of Osimertinib with or without Platinum Plus Pemetrexed Chemotherapy, as First-line Treatment in Patients with Epidermal Growth Factor Receptor (EGFR) Mutation-Positive, Locally Advanced or Metastatic Non-small Cell Lung Cancer".

The following study is carried out to confirm the benefit of the combination of osimertinib, pemetrexed and platinum chemotherapy in the treatment of patients with locally-advanced or metastatic EGFR mutation-positive NSCLC.

Overview of Study Design

This will be a global Phase III, open-label, randomized study conducted in patients with locally-advanced or metastatic EGFR mutation-positive (Ex19del and/or L858R) NSCLC who have not received any prior therapy for advanced disease and have a World Health Organization (WHO) performance status (PS) of 0 or 1. Approximately 556 patients will be enrolled in approximately 24 countries. The study will enrol approximately 60% of Asian patients and 40% of Non-Asian patients.

Prior to the start of the Phase III randomized portion of the study, a non-randomized safety run-in phase will enrol up to 30 patients to evaluate the safety and tolerability of the combination of osimertinib with platinum chemotherapy (carboplatin or cisplatin) and pemetrexed.

The proposed study will only allow enrolment of patients with EGFR mutation-positive NSCLC who have either: (1) a pre-existing positive (Ex19del or L858R) tissue test obtained from a Clinical Laboratory Improvement Amendments (CLIA)-certified local laboratory (for US sites) or from an accredited local laboratory (for sites outside of the US); or (2) have a positive tissue Ex19del or L858R EGFR mutation test based on the COBAS™ EGFR Mutation Test v2 conducted prospectively in a central laboratory.

During the safety run-in portion of the study, 2 cohorts of patients (osimertinib plus cisplatin/pemetrexed and osimertinib plus carboplatin/pemetrexed) will be studied in a non-randomized fashion. Up to 15 patients per cohort will receive osimertinib 80 mg once daily in combination with either cisplatin (75 mg/m$^2$) or carboplatin (AUC 5), and pemetrexed (500 mg/m$^2$), both administered Q3W for 4 cycles, followed by osimertinib 80 mg once daily plus pemetrexed maintenance (500 mg/m$^2$) Q3W until RECIST v1.1-defined progression or another discontinuation criterion is met.

For each cohort of the safety run-in, safety data from at least 12 evaluable patients who have completed at least 3 cycles of platinum/pemetrexed doublet therapy in combination with osimertinib will be reviewed by a Safety Review Committee (SMC). The SRC will recommend whether the data support the initiation of the randomized portion of the study.

Patients enrolled in the safety run-in will continue on their allocated treatment per protocol. Safety and tolerability data from the safety run-in portion of the study will be reviewed in all patients who took at least 1 dose of osimertinib and started a cycle of chemotherapy. The data will be assessed by the SRC. Patients included in the safety run-in component of the study will be excluded from the analysis of the Phase III randomized component.

After completion of the safety run-in, subject to discussion with the SRC, new patients will be randomized in a 1:1 ratio to receive osimertinib alone or in combination with pemetrexed and either cisplatin or carboplatin. Patients will be stratified prior to randomisation by race (Chinese/Asian vs. non-Chinese/Asian vs. non-Asian, with a total of approximately 60% Asian and 40% non-Asian), World Health Organization (WHO) performance status (PS) (0 or 1), and method for tissue testing (central vs. local). The Investigator will decide before randomization which chemotherapy regimen (carboplatin/pemetrexed or cisplatin/pemetrexed) a patient would receive in case the patient is assigned to the osimertinib plus chemotherapy arm.

The 2 treatment regimens will be as follows;
a) Osimertinib 80 mg once daily; or
b) Osimertinib 80 mg once daily in combination with pemetrexed (500 mg/m$^2$) (with vitamin supplementation) plus either cisplatin (75 mg/m$^2$) or carboplatin (AUC5), all administered on Day 1 of 21-day cycles for 4 cycles, followed by pemetrexed maintenance (500 mg/m$^2$) Q3W.

Randomized treatment will continue until RECIST v1.1-defined progression or until another discontinuation criterion is met.

Following treatment discontinuation, subsequent therapy will be at the discretion of the investigator. Patients will be followed for second progression on a subsequent treatment, defined according to local practice, and for survival.

Oversight of safety and tolerability of the randomized phase of the study will be provided solely by an Independent Data Monitoring Committee (IDMC), with fully independent members.

The primary endpoint will be PFS based on Investigator assessment using RECIST v1.1. A sensitivity analysis based on blinded independent central review (BICR) of efficacy data from all randomized patients will also be conducted. Secondary endpoints will include OS, Landmark OS, PFS2, ORR, duration of response (DoR), DCR, safety and tolerability (based on AEs, laboratory tests [clinical chemistry, hematology, urinalysis], vital signs [pulse and blood pressure], physical examination, weight, electrocardiogram [ECG] parameters, left ventricular ejection fraction), pharmacokinetics, and patient-reported outcomes.

Key Inclusion Criteria
  a) Pathologically confirmed nonsquamous NSCLC
  b) Newly diagnosed locally advanced (clinical stage IIIB, IIIC) or metastatic NSCLC (clinical Stage IVA or IVB) or recurrent NSCLC (per Version 8 of the International Association for the Study of Lung Cancer [IASLC] Staging Manual in Thoracic Oncology), not amenable to curative surgery or radiotherapy.
  c) The tumour harbours 1 of the 2 common activating EGFR mutations known to be associated with EGFR-TKI sensitivity (Ex19del or L858R), either alone or in combination with other EGFR mutations, assessed by a CLIA-certified (US sites) or an accredited local laboratory (sites outside of the US) or by central prospective testing.
  d) Mandatory provision of a baseline plasma sample and an unstained, archival tumor tissue sample in a quantity sufficient to allow for central confirmation of the EGFR mutation status. Please refer to the Laboratory Manual for details.
  e) Patients must have untreated advanced NSCLC not amenable to curative surgery or radiotherapy. Prior adjuvant and neo-adjuvant therapies (chemotherapy, radiotherapy, immunotherapy, biologic therapy, investigational agents), or definitive radiation/chemoradiation with or without regimens including immunotherapy, biologic therapy, investigational agents, are permitted as long as treatment was completed at least 12 months prior to the development of recurrent disease.
  f) WHO PS of 0 to 1 at screening with no clinically significant deterioration in the previous 2 weeks.
  g) At least 1 lesion, not previously irradiated that can be accurately measured at baseline as ≥10 mm in the longest diameter (except lymph nodes, which must have a short axis of ≥15 mm) with CT or MRI, and that is suitable for accurate repeated measurements. If only 1 measurable lesion exists, it is acceptable to be used (as a target lesion) as long as it has not been previously irradiated and baseline tumor assessment scans are not performed within 14 days following a biopsy of the lesion.

Key Exclusion Criteria
  a) Spinal cord compression; symptomatic and unstable brain metastases, except for those patients who have completed definitive therapy, are not on steroids, have a stable neurological status for at least 2 weeks after completion of the definitive therapy and steroids. Patients with asymptomatic brain metastases can be enrolled if in the opinion of the Investigator immediate definitive treatment is not indicated
  b) Past medical history of ILD, drug-induced ILD, radiation pneumonitis, which required steroid treatment, or any evidence of clinically active ILD.
  c) Any evidence of severe or uncontrolled systemic diseases, including uncontrolled hypertension and active bleeding diatheses, which in the Investigator's opinion makes it undesirable for the patient to participate in the trial or which would jeopardize compliance with the protocol, or active infection including hepatitis B, hepatitis C and human immunodeficiency virus (HIV). Screening for chronic conditions is not required
  d) Any of the following cardiac criteria:
    Mean resting corrected QT interval (QTc)>470 msec, obtained from 3 electrocardiograms (ECGs), using the screening clinic ECG machine-derived QTcF value;
    Any clinically important abnormalities in rhythm, conduction, or morphology of resting ECG; eg, complete left bundle branch block, third-degree heart block, second-degree heart block;
    Any factors that increase the risk of QTc prolongation or risk of arrhythmic events such as electrolyte abnormalities including serum/plasma potassium*, magnesium* and calcium* below the lower limit of normal (LLN), heart failure, congenital long QT syndrome, family history of long QT syndrome, or unexplained sudden death under 40 years of age in first-degree relatives or any concomitant medication known to prolong the QT interval and cause Torsades de Pointes.
  correction of electrolyte abnormalities to within normal ranges can be performed during screening.
  e) Inadequate bone marrow reserve or organ function as demonstrated by any of the following laboratory values:
    Absolute neutrophil count below the lower limit of normal (<LLN)*
    Platelet count below the LLN*
    Hemoglobin <90 g/L*
    The use of granulocyte colony stimulating factor support, platelet transfusion and blood transfusions to meet these criteria is not permitted.
    ALT>2.5×the upper limit of normal (ULN) if no demonstrable liver metastases or >5×ULN in the presence of liver metastases.
    AST>2.5×ULN if no demonstrable liver metastases or > 5×ULN in the presence of liver metastases.
    Total bilirubin >1.5×ULN if no liver metastases or > 3×ULN in the presence of documented Gilbert's Syndrome (unconjugated hyperbilirubinemia) or liver metastases.
  Creatinine clearance <60 mL/min calculated by Cockcroft and Gault equation.
  f) Prior treatment with any systemic anti-cancer therapy for advanced NSCLC not amenable to curative surgery or radiation including chemotherapy, biologic therapy, immunotherapy, or any investigational drug. Prior adjuvant and neo-adjuvant therapies (chemotherapy, radiotherapy, immunotherapy, biologic therapy, investigational agents), or definitive radiation/chemoradiation with or without regimens including immunotherapy, biologic therapies, investigational agents are permitted as long as treatment was completed at least 12 months prior to the development of recurrent disease.
  g) Prior treatment with an EGFR-TKI.

Analysis

The Phase III component of the study will only start after a review of the data from up to 30 patients included in the safety run-in component of the study. Up 15 patients (with a minimum of 12 patients) will be treated with osimertinib in combination with each of the 2 chemotherapy regimens for at least 3 cycles.

Safety and tolerability data from the safety run-in portion of the study will be reviewed in all patients who took at least 1 dose of osimertinib and started a cycle of chemotherapy. The data will be assessed by the SRC, which will be in place only for the safety run-in.

Patients included in the safety run-in component of the study will be excluded from the analysis of the Phase III randomized component.

For the Phase III component, approximately 556 patients will be randomized globally in a 1:1 ratio to this study. The primary endpoint of the study is PFS based on investigator assessment (according to RECIST v1.1).

Progression-free survival will be defined as the time from randomization until the date of objective disease progression or death (by any cause in the absence of progression) regardless of whether the patient withdraws from randomized therapy or receives another anti-cancer therapy prior to progression. Patients who have not progressed or died at the time of analysis will be censored at the time of the latest date of assessment from their last evaluable RECIST assessment.

The primary analysis of PFS based on Investigator assessment (according to RECIST 1.1) will occur when approximately 278 PFS events have been observed in the 556 randomized patients (approximately 50% maturity). This is expected to occur approximately 33 months after the first patient is randomized (under an assumed 15-month exponential recruitment). If the true PFS HR for the comparison of osimertinib with chemotherapy vs. osimertinib monotherapy is 0.68, 280 progression events will provide 90% power to demonstrate a statistically significant difference in PFS at a 5% two-sided significance level. This translates to an approximate improvement in median PFS from 19 months to 28 months, assuming exponential distribution and proportional hazards. The minimum critical HR is 0.79, which translates to an approximate median PFS improvement from 19 months to 24 months.

Progression-free survival will be analysed using a log-rank test stratified by race (Chinese/Asian vs. non-Chinese/Asian vs. non-Asian), WHO PS (0 vs. 1), and method for tissue testing (central vs. local) for generation of the p-value, using the Breslow approach for handling ties. The assumption of proportionality will be assessed. A sensitivity analysis of PFS will be performed based on data assessed by blinded independent central review (BICR) for all patients. A prespecified subgroup analysis will be conducted in patients who have a centrally confirmed EGFR mutation status by COBAS™ tissue or COBAS™ plasma tests, either used for eligibility into the study or retrospectively if eligibility was per a locally accredited test.

The key secondary endpoint of OS will be tested in a hierarchical procedure, at the time of the PFS analysis and after the primary PFS analysis when the OS data are approximately 60% mature (approximately 334 death events across both arms). Alpha will be controlled across the 2 OS analyses; i.e., at the time of the primary PFS analysis and at the final OS analysis, with the overall Type 1 error strongly controlled at 5% (2 sided) for the testing of OS under an O'Brien and Fleming spending rule. Under assumed medians of 40 months and 52 months (HR=0.77) for osimertinib monotherapy and osimertinib with chemotherapy, respectively, 170 observed events (information fraction of 0.51) are expected at the time of the primary PFS analysis with 2-sided alpha of 0.0034, with the remaining alpha assigned to the final OS analysis (0.0490).

Additional efficacy endpoints will be included such as ORR and time to second progression or death (PFS2).

The Investigator will identify the chemotherapy regimen to be used (cisplatin/pemetrexed or carboplatin/pemetrexed) if the patient is randomized to the combination arm prior to randomization. The choice of chemotherapy regimen will be taken at a patient level. After progression, the choice of subsequent therapy will be by Investigator's choice.

An IDMC composed of fully independent members will be convened and meet periodically to review safety data and will make recommendations to continue, amend, or stop the study based on findings.

Serious AEs, AEs, and other safety data will be reviewed, and individual and aggregated safety data will be evaluated by the IDMC.

The invention claimed is:

1. A method of treating locally-advanced or metastatic EGFR mutation-positive NSCLC in an EGFR TKI-naïve human patient comprising administering to the patient an EGFR TKI, wherein the EGFR TKI is administered in combination with pemetrexed and platinum chemotherapy, and wherein the EGFR TKI is osimertinib, or a pharmaceutically acceptable salt thereof.

2. The method according to claim 1, wherein the platinum chemotherapy comprises a platinum-based agent selected from cisplatin or carboplatin.

3. The method according to claim 1, wherein the pemetrexed and platinum chemotherapy are administered on day 1 only of a treatment cycle lasting 21 days.

4. The method according to claim 1, wherein the pemetrexed and platinum chemotherapy are administered on day 1 only of a treatment cycle lasting 21 days for four sequential cycles, followed by administration of pemetrexed once every 21 days until disease progression or unacceptable toxicity.

5. The method according to claim 1, wherein the EGFR mutation-positive NSCLC comprises activating mutations in EGFR selected from exon 19 deletions or L858R substitution mutations.

6. The method according to claim 1, wherein the locally-advanced or metastatic EGFR mutation-positive NSCLC is a metastatic EGFR mutation-positive NSCLC.

7. The method according to claim 1, wherein the osimertinib, or a pharmaceutically acceptable salt thereof, is administered once-daily.

8. The method according to claim 1, wherein the osimertinib, or a pharmaceutically acceptable salt thereof, is administered in tablet form.

9. The method according to claim 1, wherein the osimertinib, or a pharmaceutically acceptable salt thereof, is osimertinib mesylate salt.

* * * * *